July 22, 1952 — C. GILARDI — 2,604,179
FRAME FOR LIGHT MOTORCYCLES OR MOTOR BICYCLES
Filed April 22, 1950 — 3 Sheets-Sheet 1

INVENTOR:
CARLO GILARDI
BY K. A. Mayr
ATTORNEY:

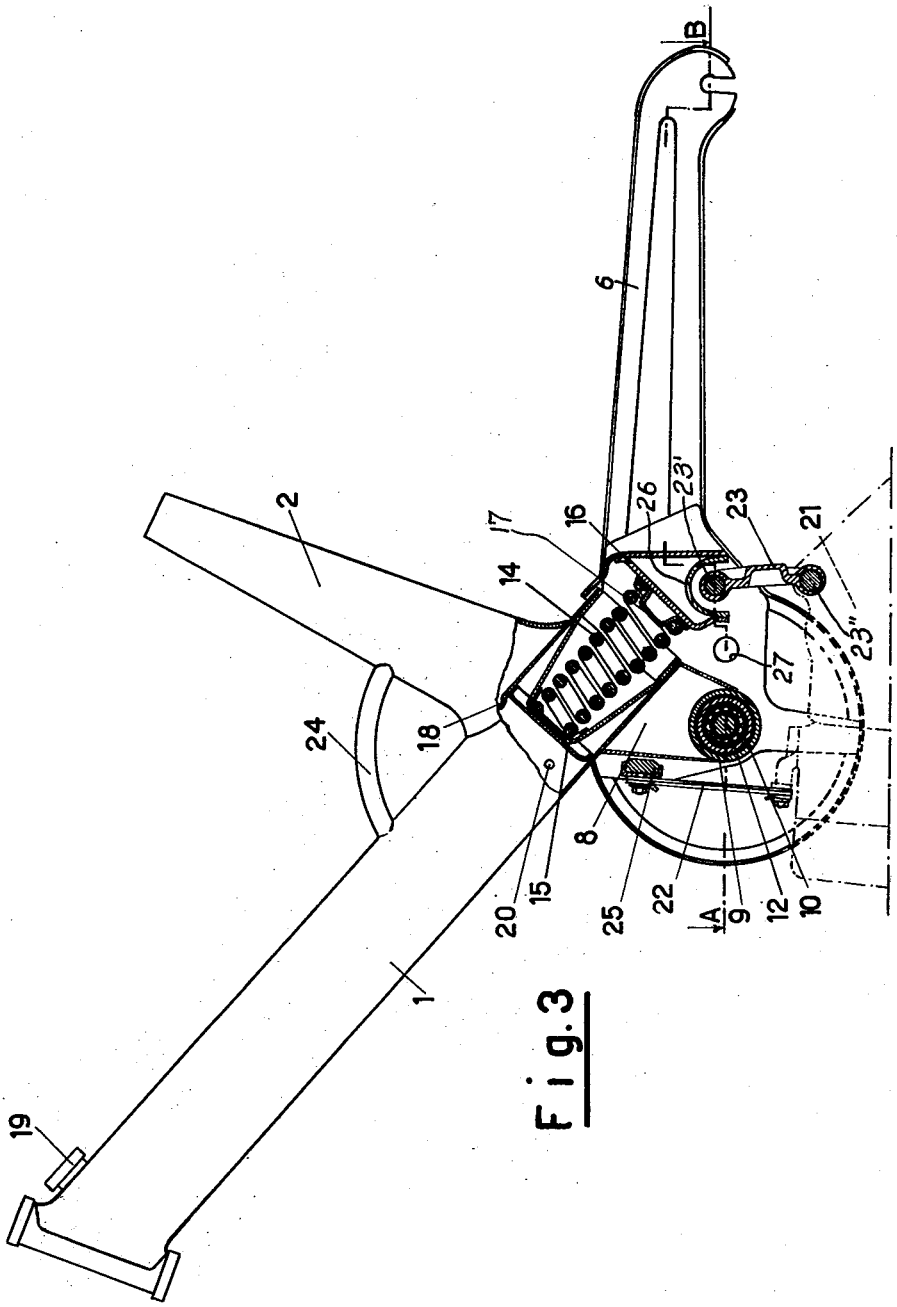

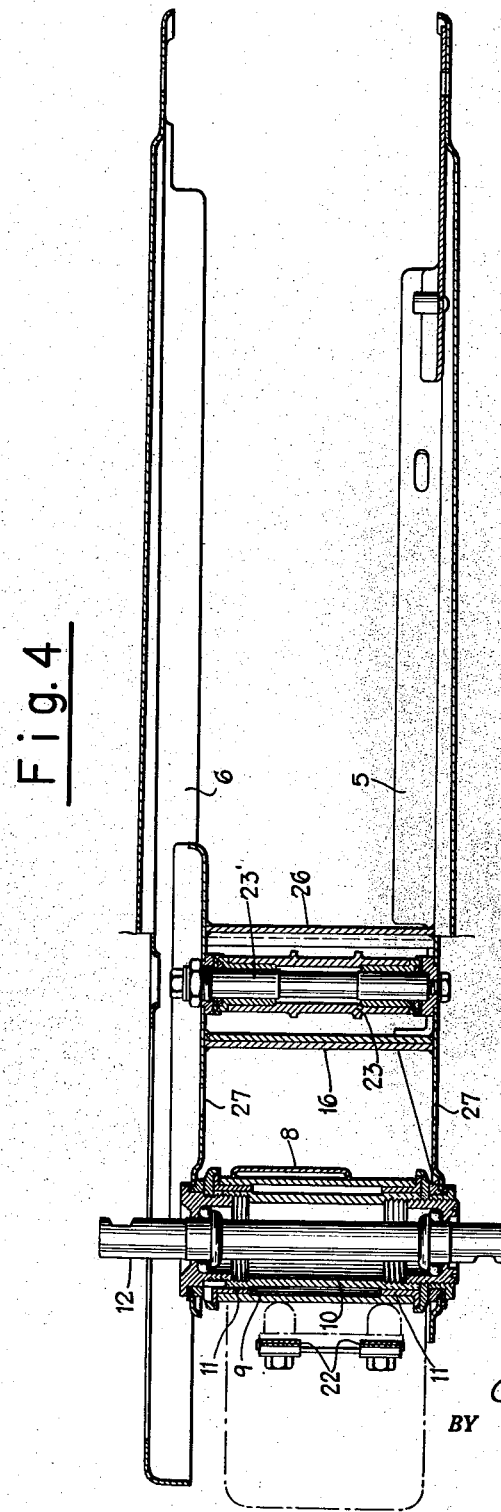

Patented July 22, 1952

2,604,179

UNITED STATES PATENT OFFICE 2,604,179

FRAME FOR LIGHT MOTORCYCLES OR MOTOR-BICYCLES

Carlo Gilardi, Milan, Italy

Application April 22, 1950, Serial No. 157,463
In Italy March 31, 1950

5 Claims. (Cl. 180—35)

The present invention relates to a frame for a light motorcycle or a motor-bicycle, wherein the chain guard constitutes a carrying member of the frame and is mounted to swing elastically on the hub of the pedal gear.

According to the present invention, the frame is formed by two tube-structures rigidly united in the shape of a V, one of which carries at its end the saddle and the other the steering tube; these two structures are hollow and in communication with each other so as to constitute a single tank for the fuel.

The lower end of the structure carrying the steering tube, contains a spring reacting on a cross-piece connecting a pair of structures of stamped plate in the shape of a chain guard, which carry the rear wheel and are pivoted concentrically with the axis of the pedal gear on an extension fixed on said structure carrying the steering tube.

The frame constituted in this way, therefore, is reduced merely to two members rigidly united with each other to form a V-shape and a pair of members hinged to the former in the neighbourhood of their junction so as to swing elastically about the hinge axis; moreover, the spring, which is very near to the swinging centre of said pair of members, is subjected to a very small deformation although it allows for ample oscillations of the wheel and may be short enough, therefore, as to be contained in the end portion of the hollow member carrying the steering tube, the end support of the spring within said tube not preventing, anyhow, free communication of said hollow member with the other one carrying the saddle to form the single fuel tank.

This result is attained by utilizing the ruggedness of the rear fork due to its shape of a double chain guard, which enables it to stand the considerable stress of the spring which reacts at a very short distance from the hinge. The aforementioned shape of the fork, besides protecting the transmission chain, also allows to hide the aforementioned spring, thus eliminating the unpleasant appearance which the latter would afford if not concealed; moreover, the pair of oscillating members is thus strong enough to support the engine with no difficulties in such a manner that it finds its place in the lowest possible position, with improvement of stability and is more safely protected both on the right and left hand in case of accidental falling.

An embodiment of the present invention is illustrated in the accompanying drawings, wherein:

Fig. 3 is a vertical longitudinal part section of the frame;

Fig. 4 is a section of Fig. 3 through the line A—B.

Figure 1:
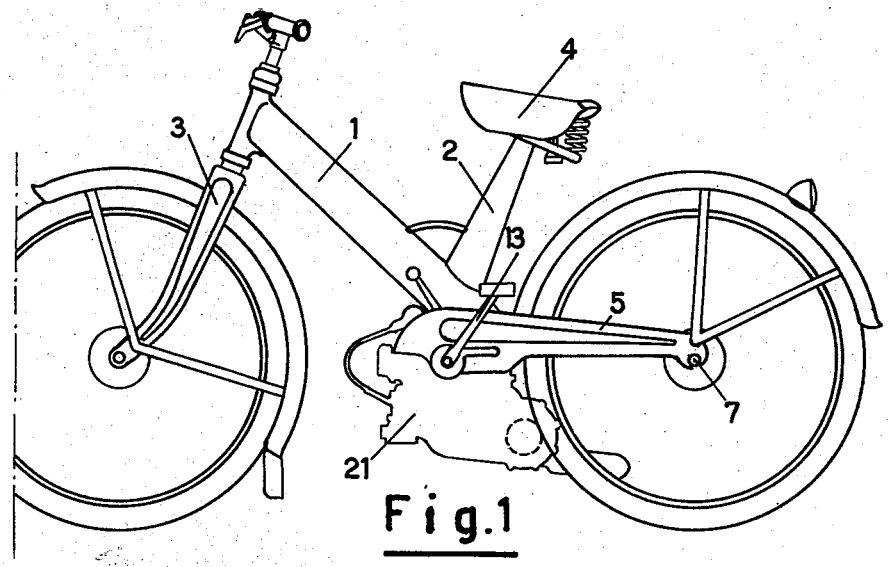
Fig. 1 is an elevation view from the left side of a motor-bicycle with a frame according to the invention.
Figure 2:
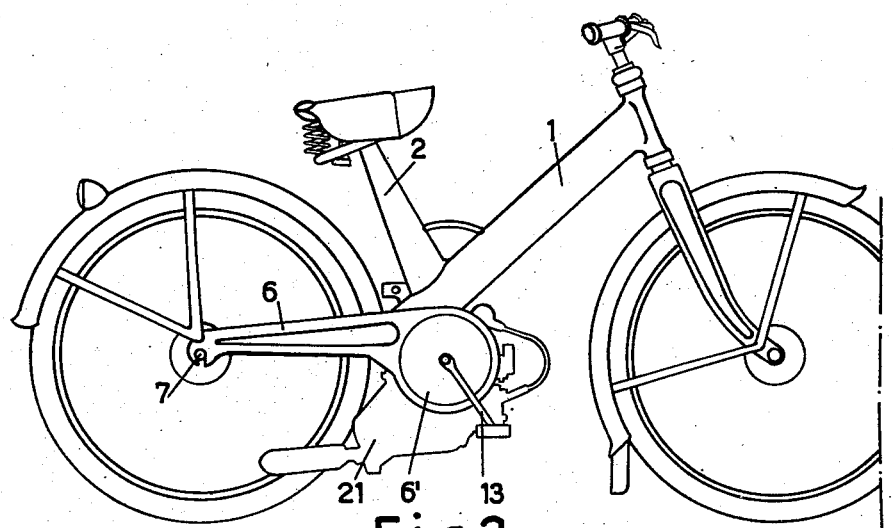
Fig. 2 is an elevation view from the right side of the same.

With reference to Figures 1 and 2, the frame is composed of two tubular pieces 1 and 2, the second of which is butt-joined on the former near the lower end thereof so as to form a rigid V-shaped structure. The upper end of the piece 1 carries rotatably the steering post 3, which may be of any known kind, with a rigid or spring-supported fork, while the saddle 4 is fixed to the upper end of the piece 2. The other two members constituting the frame are indicated with 5 and 6; they have the shape of a chain guard and support the axle 7 of the rear wheel. These members 5 and 6 are fastened to each other and the forward portion of the resulting assembly is swingably connected with the hollow V-shaped member consisting of the members 1 and 2, the swing axis coinciding with the axis of crankshaft 12 as more clearly visible in Figures 3 and 4.

With reference to Figure 3 of the drawing, the lower end of piece 1 carries a short bracket 8 which supports a sleeve 9. Said sleeve contains the freely rotatable hub 10, with the intermediary of antifriction metal bushes 11. The hub 10 is fixed to the two members 5 and 6 and constitutes the support for the axle 12 of the pedal cranks 13. The member 6 constitutes the guard covering the transmission sprocket and chain, not represented in the drawing and is closed by a cover 6' (Fig. 2); the member 5 repeats in part the shape of member 6 as can be seen in Fig. 1.

Both of these members have a moment of resistance capable of standing the bending moment caused by the reaction of the rear wheel. In order to balance said bending moment, since the hub 10 is freely rotatable with respect to the members 1 and 2, a spring 14 is provided, which is partly contained within the end portion of the member 1. The upper end of spring 14 rests on a plate 15 fixed within member 1. Plate 15 is below the top of the connection between the members 1 and 2. The lower end of spring 14 rests against a transverse member 16 connected to members 5 and 6 and provided with a cylindrical projection 17, which prevents lateral displacement of the spring.

It can be seen that with the arrangement hereinbefore described, the interiors of the two members 1 and 2 can easily be made to communicate through a hole 18 provided in the member 1 in the zone where the latter is connected to the member 2. The interiors of members 1 and 2 are used as a fuel tank which can be filled through a filling hole 19, which may be provided at any other suitable position; for example, under the saddle. The fuel is drawn from the lowest part of the tank through a hole 20 from which it is conveyed to the engine for example by way of pipe.

The engine is designated by reference numeral 21 in Figures 1 to 3 and is represented diagrammatically, since its structure is not a part of the present invention. However, it may be of interest that the members 5 and 6, because of their shape, have the necessary stiffness to support the engine 21 by means of hangers 22 and 23, the former comprising a flexible member and the latter a bracket 23 whose upper end is pivoted to the member composed of parts 5 and 6 by pivot 23' and whose lower end is pivoted to the engine by pivot 23''; hanger 22 and pivot 23' are inside the member composed of plates 5 and 6. The engine is thus in a fixed position with respect to the rear wheel, though it is spring-supported with respect to the road-way together with the remainder of the frame. A cover 26 is provided over pivot 23', and the plates supporting axle 12 and pivot 23' are provided with holes 27.

Moreover, as can be easily seen in the drawing, the spring 14, though very short, allows for ample elastic oscillations of the part formed by members 5 and 6 with respect to the members 1 and 2, because the lever arm of the spring 14 with respect to the centre of oscillation is very small as compared with the lever arm of the axle 7 of the rear wheel.

The small external dimensions of the spring placed in the aforedescribed position, allow the members 5 and 6 to conceal the same while communication between members 1 and 2 is uninhibited so that they may be used as a fuel tank.

Numeral 24 designates a handle for lifting the vehicle and numeral 25 designates a rubber cushion which, bearing against the piece 8, prevents the pair of members 5 and 6 from tilting downward if the vehicle is lifted.

Having now particularly described and ascertained the nature of my said invention and in what manner the same is to be performed, I declare that what I claim is:

1. A frame for a light motor-cycle or motor-bicycle having a crankshaft, a steering post, a saddle, a chain, and a rear wheel driven by said chain, said frame comprising a hollow V-shaped member having a forward leg supporting said steering post, a rearward leg supporting said saddle, and bracket means supporting said crankshaft and extending from the portion of said V-shaped member where its legs are united, a pair of rigidly connected frame members forming a guard for said chain and supporting said rear wheel, said frame members having a forward portion laterally shielding said bracket means and being swingably connected with said V-shaped member to swing about the axis of said crankshaft, and a spring interposed between said frame members and extending partly into said V-shaped member at the junction of its legs.

2. A frame as set forth in claim 1, in which said V-shaped member serves as a fuel tank, said forward leg being substantially tubular and having a lower portion to which said rearward leg is laterally connected, an aperture in said lower portion affording communication of the interiors of said forward leg and of said rearward leg, and closure means in said lower portion disposed below said aperture and serving as an abutment for the upper end of said spring.

3. A frame as defined in claim 1, comprising connecting means for said frame members, said spring having a lower end resting against said connecting means.

4. A frame as defined in claim 1, said bracket means comprising a sleeve portion; a tubular member rotatable in said sleeve portion, extending coaxially of said crankshaft and transversely to said forward portion of said frame members, and being rigidly connected thereto; and bearings for said crankshaft supported by said tubular member.

5. A frame for a light motor-cycle or motor-bicycle having an engine, a crankshaft, a steering post, a saddle, a chain, and a rear wheel driven by said chain, said frame comprising a hollow V-shaped member serving as a fuel tank and having a forward leg supporting said steering post, a rearward leg supporting said saddle, and bracket means supporting said crankshaft and extending from the portion of said V-shaped member where its legs are united, a pair of rigidly connected frame members forming a guard for said chain and supporting said rear wheel, said frame members having a forward portion laterally shielding said bracket means and being swingably connected with said V-shaped member to swing about the axis of said crankshaft, a spring interposed between said frame members and extending partly into said V-shaped member at the junction of its legs, said forward portion of said frame members having an inside, and hangers connected with said forward portion of said frame members at the inside thereof for suspending said engine.

CARLO GILARDI.

REFERENCES CITED

The following references are of record in the file of this patent:

UNITED STATES PATENTS

| Number | Name | Date |
|---|---|---|
| 564,155 | Millet | July 14, 1896 |
| 598,234 | Thompson | Feb. 1, 1898 |
| 739,034 | Travis | Sept. 15, 1903 |
| 1,479,738 | Pullin | Jan. 1, 1924 |
| 2,082,147 | Bryant | June 1, 1937 |
| 2,446,731 | Wheler | Aug. 10, 1948 |
| 2,491,076 | Benazzoli | Dec. 13, 1949 |